United States Patent
Chao

[11] Patent Number: 6,097,729
[45] Date of Patent: Aug. 1, 2000

[54] NETWORK SWITCHER

[75] Inventor: Rui-Fu Chao, Hsinchu, Taiwan

[73] Assignee: Winbond Electronics Corp., Taiwan

[21] Appl. No.: 08/886,943

[22] Filed: Jul. 2, 1997

[30] Foreign Application Priority Data

May 1, 1997 [TW] Taiwan ................................ 86105775

[51] Int. Cl.[7] ........................ H04L 12/56; H04L 12/66; H04J 3/16
[52] U.S. Cl. ........................ 370/463; 370/465; 370/401
[58] Field of Search ................................ 370/400, 401, 370/402, 389, 396, 236, 463, 465, 356, 419, 420, 421, 422, 522

[56] References Cited

U.S. PATENT DOCUMENTS

| | | | |
|---|---|---|---|
| 4,823,338 | 4/1989 | Chan et al. | 370/522 |
| 5,394,402 | 2/1995 | Ross | 370/402 |
| 5,617,421 | 4/1997 | Chin et al. | 370/402 |
| 5,825,772 | 4/1996 | Dobbins | 370/401 |

*Primary Examiner*—Chi H. Pham
*Assistant Examiner*—Steven Nguyen
*Attorney, Agent, or Firm*—Rabin & Champagne, P.C.

[57] ABSTRACT

A network switcher for data transfer between a network communication unit and a plurality of nodes is provided. In this network switcher, the interface ports or MAC (media access control) addresses are divided into groups, and the data transfer is permitted only between those interface ports or MAC addresses within the same group. This feature can avoid a node-information signal whose destination address is not yet acknowledged to be transferred to all of the other interface ports beside the destination one. Conventionally, this drawback significantly degrades the performance of the overall network system. This network switcher allows an improvement on the performance of network systems that has a number of nodes.

14 Claims, 8 Drawing Sheets

NETWORK SWITCHER

BACKGROUND OF THE INVENTION

1. Field of the Invention

This invention relates to network systems, and more particularly, to a network switcher for data transfer between various nodes, which can serve as a virtual local area network (VLAN).

2. Description of Related Art

Figure 1:
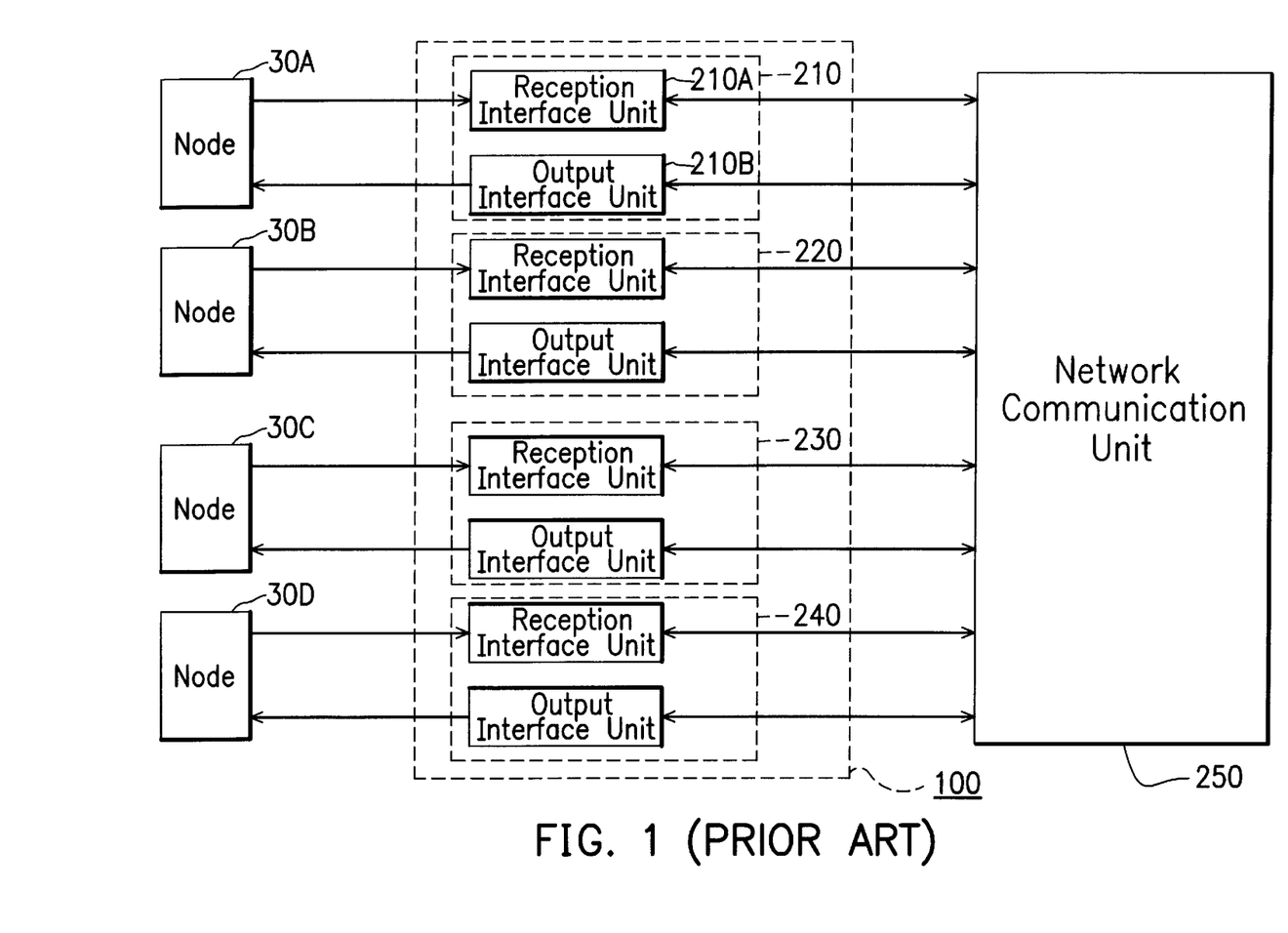
FIG. 1 is a schematic block diagram of a conventional network system which includes a network switcher connected between a network communication unit and a plurality of nodes.

FIG. 1 is a schematic diagram of a conventional network system in which a network switcher 10 is connected between a network communication unit 20 and a plurality of nodes 30A, 30B, 30C, 30D. Each node can be a workstation or PC (personal computer). In the case of FIG. 1, the network switcher 10 includes four interface ports 12, 14, 16, 18 respectively linking the four nodes 30A, 30B, 30C, 30D to the network communication unit 20. Each of the interface ports 12, 14, 16, 18 includes a reception interface unit 12A for transferring an outgoing node-information signal from the associated node (i.e., the source of the node-information signal) to the network communication unit 20, and an output interface unit 12B for transferring an incoming node-information signal from the network communication unit 20 to the associated node (i.e., the destination of the node-information signal).

In operation, the nodes 30A, 30B, 30C, 30D can forward and receive information via the interface ports 12, 14, 16, 18 and the network communication unit 20 to and from other various nodes at remote sites. The network communication unit 20 can be, for example, a fiber-optic system which can transmit information at high speeds and large volumes.

Figure 2:
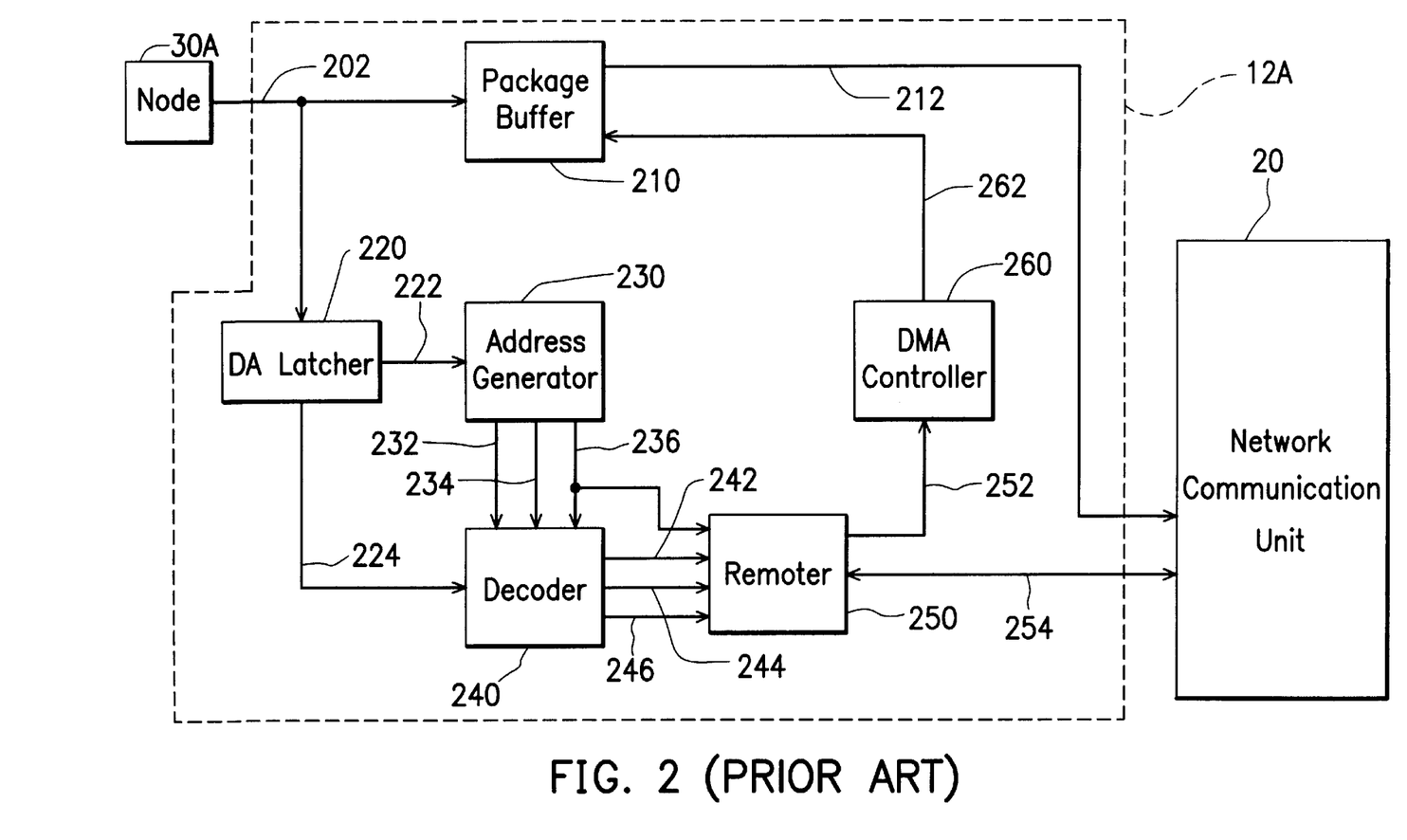
FIG. 2 is a schematic block diagram showing a more detailed structure of the reception interface unit used in the network switcher shown in FIG. 1.

FIG. 2 is a schematic block diagram depicting a more detailed structure of the reception interface unit 12A used in the network system of FIG. 1. As shown, the reception interface unit 12A includes a package buffer 210, a Destination Address (DA) Latcher 220, an address generator 230, a decoder 240, a remoter 250, and a DMA (direct memory access) controller 260.

When a certain node, for example the node 30A wants to send information via the associated reception interface unit 12A to a certain destination, the node 30A issues and transfers a node-information signal via the signal line 202 to both of the package buffer 210 and the DA Latcher 220 in the reception interface unit 12A. The package buffer 210 stores the node-information temporarily therein, while the DA Latcher 220 generates a Destination Address (DA) signal and a Destination Address Latch (DA_Latch) signal in response to the node-information signal. The DA signal is transferred respectively via the signal line 222 to the address generator 230, while the DA_Latch signal is transferred via the signal line 224 to the decoder 240. The DA signal is, for example, a 12-bit binary signal. In response to the DA signal, the address generator 230 generates and transfers a Destination Address Control (DA_Control) signal via the signal line 232 to the decoder 240, a Destination Address (DA) buffer signal via the signal line 234 to the decoder 240, and a Destination Port (DP) signal via the signal line 236 to both of the decoder 240 and the remoter 250. The contents of these signals indicate, for example, whether the access is still valid or expired, which interface port the MAC (media access control) address is associated with, and so on.

The decoder 240, in response to the DA_Latch signal received from the signal line 224, the DA_control signal received from the signal line 232, the DA signal from the signal line 234, and the DP signal received from the signal line 236, generates a Broadcast-pkt ("pkt": short for "packet") signal, a Remote-pkt signal, and a Local-pkt signal, which are respectively transferred via the signal lines 242, 244, 246 to the remoter 250. The Broadcast-pkt signal indicates whether the node-information signal is to be forwarded to all of the linked ports; the Remote-pkt signal indicates whether the node-information signal is to be forwarded to a single specified port; and the Local-pkt signal indicates whether the node-information signal is restricted for local transfer. To obtain the logic values of these signals, the decoder 240 performs a decoding procedure in accordance with the following algorithm:

Local-pkt=(DA control signal valid) &
    (DP is the port ID code of this node) &
    (DA=DA_Latch)
Remote-pkt=(DA_Control signal valid) &
    (DP is not the port ID code of this node) &
    (DA=DA_Latch)
Broadcast-pkt=an identification method other than the foregoing.

Subsequently, the remoter 250, in response to the DP signal received from the signal line 236, the Broadcast-pkt signal received from the signal line 242, the Remote-pkt signal received from the signal line 244, and the Local-pkt signal received from the signal line 246, generates a Remote Control signal and a Remote-Access Control signal, which are respectively transferred via the signal line 252 to the DMA controller 260 and via the signal line 254 to the network communication unit 20. In response to the Remote-Access Control signal, the DMA controller 260 generates and transfers a DMA control signal via the signal line 262 to the package buffer 210. In response to the DMA control signal, the package buffer 210 outputs and transfers the packet of the earlier received node-information via the data line 212 to the network communication unit 20. Meanwhile, the network communication unit 20, in response to the Remote Control signal, forwards the node-information signal received from the data line 212 to the prescribed destination. After the data transfer is completed, the network communication unit 20 will return a confirmation signal indicative of the success or failure of the data transfer via the signal line 254 to the remoter 250.

Figure 3:
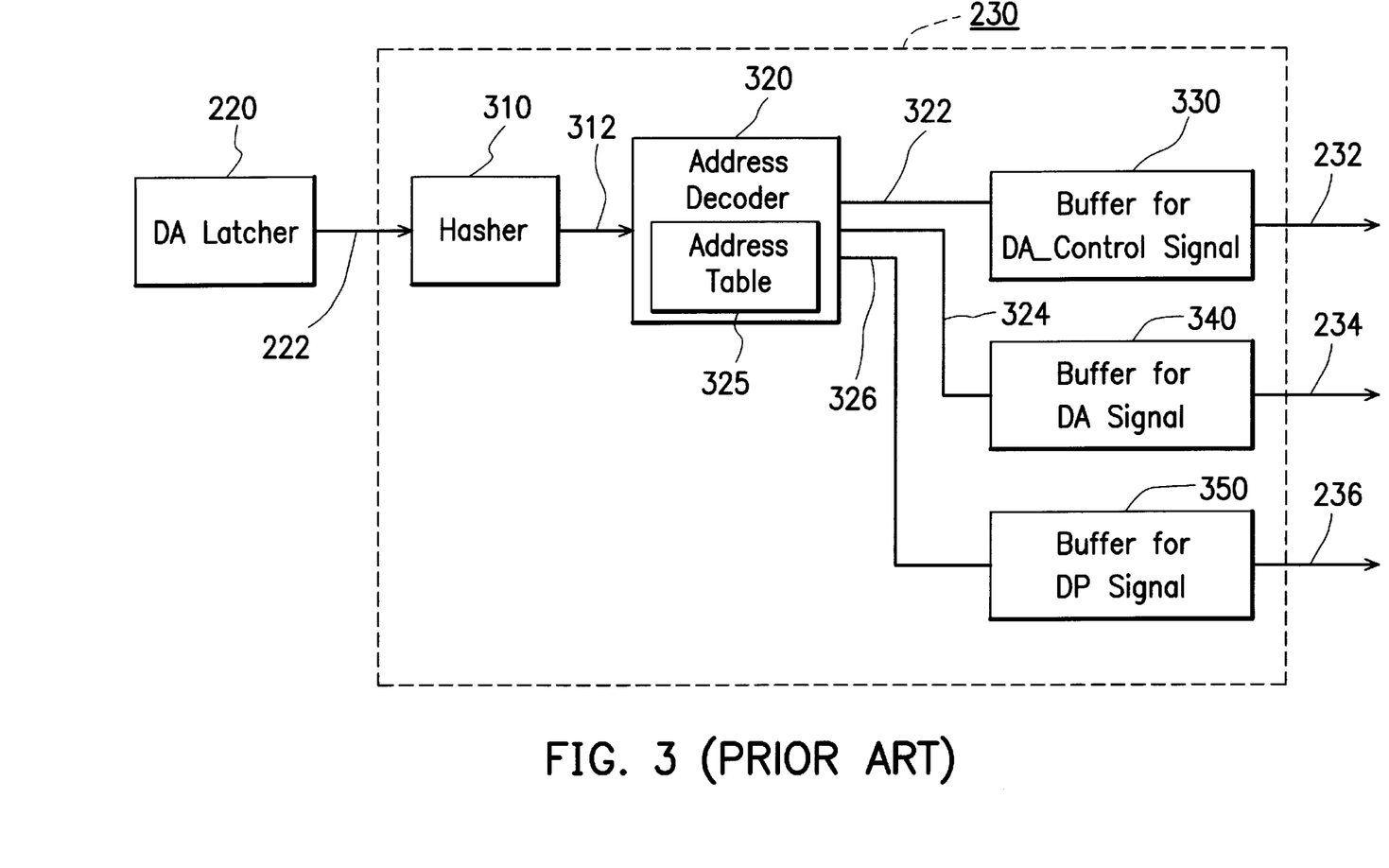
FIG. 3 is a schematic block diagram showing a more detailed structure of the address generator used in the reception interface unit shown in FIG. 2.

FIG. 3 is a schematic block diagram showing a more detailed structure of the address generator 230 used in the reception interface unit 12A shown in FIG. 2. As shown, the address generator 230 includes a signal processor 310, an address decoder 320, having a built-in Address Table 325, and three buffers 330, 340, 350. The signal processor 310 receives the DA signal from the DA Latcher 220 via the signal line 222 and then converts it into a 12-bit format. The output of the signal processor 310 is transferred via the signal line 312 to the address decoder 320 where it is compared with the Address Table 325 to thereby generate a Destination Address Control (DA_Control) signal, a Destination Address (DA) buffer signal, and a Destination Port (DP) signal, which are respectively transferred via the signal lines 322, 324, 326 to the buffers 330, 340, 350 and temporarily stored therein before being transferred onwards via the signal lines 232, 234, 236 to the decoder 240 (FIG. 2).

Figure 4:
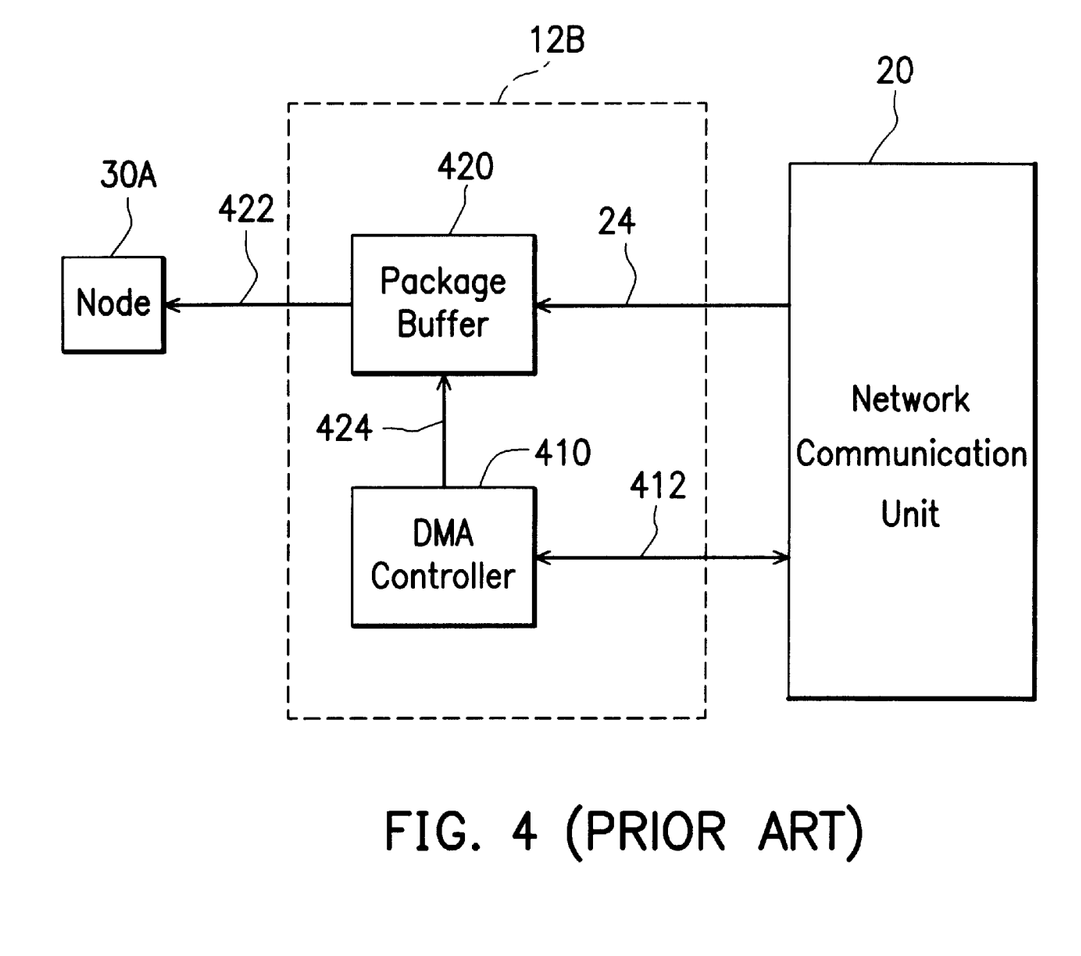
FIG. 4 is a schematic block diagram showing a more detailed structure of the output interface unit used in the network switcher shown in FIG. 1.

FIG. 4 is a schematic block diagram showing a more detailed structure of the output interface unit 12B used in the network switcher shown in FIG. 1. As shown, the output interface unit 12B includes a DMA (direct memory access) controller 410 and a package buffer 420. The DMA controller 410 is used to control the data transfer from the network communication unit 20 through the package buffer 420 to the node 30A. The DMA controller 410 generates and transfers a DMA control signal via the signal line 412 to the network communication unit 20. In response to the DMA control signal, the network communication unit 20 forwards the incoming node-information signal, which was received from a remote node in the network system, via the data line 24 to the package buffer 420, and onwards via the data line 422 to the node 30A.

One drawback to the foregoing network switcher, however, is that, when a packet is to be transferred from a source port to a destination port, if the destination address is not yet acknowledged or the transfer is a multicast, the packet can be forwarded to other ports beside the destination one. This will cause a degradation in the performance of the overall network system.

SUMMARY OF THE INVENTION

It is therefore a primary objective of the present invention to provide a network switcher in which all of the interface ports are divided into groups and the data transfer is permitted only for interface ports within the same group so that the performance of the overall network system can be more efficient.

It is another objective of the present invention to provide a network switcher in which the node-information signals are provided with a group mode which allows the node-information signals to be transferred only to those interface ports within the group indicated by the group mode in the node-information signals so that the performance of the overall network system can be more efficient. In accordance with the foregoing and other objectives of the present invention, an improved network switcher is provided. The network switcher is used for data transfer between a network communication unit and a plurality of nodes, each node issuing a node-information signal to the network switcher when the node wants to transfer data to a remote node.

The network switcher includes the following constituent elements:

(a) a plurality of reception interface units, each being coupled between the network communication unit and one of the nodes, for transferring data from the nodes to the network communication unit; when receiving a node-information signal from the associated node, each reception interface unit being capable of determining whether the node and the destination of the node-information signal belong to the same group; if yes, the reception interface unit allowing the transfer of the node-information signal to the network communication unit; and (b) a plurality of output interface units, each being coupled between the network communication unit and one of the nodes, for transferring data from the network communication unit to the nodes; when receiving an incoming node-information signal from the network communication unit that is to be transferred to a certain node connected to the network switcher, each output interface unit being capable of determining whether the destination and the source of the incoming node-information signal belong to the same group; if yes, the output interface unit allowing the transfer of the incoming node-information signal to the destination node.

In the foregoing network switcher, each of the reception interface units includes the following constituent elements:

(a) a package buffer, connected to the associated node of the reception interface unit, for temporary storage of the packet of the node-information signal issued by the associated node;

(b) a Destination Address Latcher, connected to receive the node-information signal from the, node, for generating a Destination Address signal and a Destination Address Latch signal;

(c) a Source Address Latcher, connected to receive the node-information signal from the node, for generating a Source Address signal;

(d) multiplexer means, connected to receive the Destination Address signal and the Source Address signal respectively from the Destination Address Latcher and the Source Address Latcher, for selectively outputting the Destination Address signal and the Source Address signal;

(e) an address generator connected to receive the output of the multiplexer means, when the output of the multiplexer means is the Destination Address signal, the address generator generating a Destination Address Control signal, a Destination Port signal, a Destination Address Group signal, and a Destination Address buffer signal; and when the output of the multiplexer means is the Source Address signal, the address generator generating a Source Address Control signal, a Source Address Group signal, and a Source Address buffer signal;

(f) a group decoder, coupled to receive the Destination Address Group signal and the Source Address Group signal from the address generator, for generating a Group check signal indicating whether the Destination Address and the Source Address belong to the same group;

(g) a decoder, coupled to the Destination Address Latcher, the Source Address Latcher, the address generator, and the group decoder, for generating either a Remote-pkt signal, a Local-pkt signal, or a Broadcast-pkt signal in response to the Destination Address Latch signal, the Source Address Latch signal, the Destination Address Control signal, the Destination Port signal, the Destination Address buffer signal, the Source Address Control signal, the Source Address buffer signal, and the Group check signal;

(h) a remoter, coupled to the address generator and the decoder, for generating a Remote Control signal and a Remote-Access Control signal in response to the Destination Port signal and either the Local-pkt signal, the Broadcast-pkt signal, or the Broadcast-pkt signal; and (i) a DMA controller, coupled to the remoter, for generating and transfers a DMA control signal to the package buffer in response to the Remote-Access Control signal from the remoter; the package buffer outputting and transferring the packet of the received node-information signal to the destination node in response to the DMA control signal.

Further, in the foregoing reception interface unit, the address generator includes the following constituent elements:

(a) a hasher, coupled to the multiplexer means, for processing the output of the multiplexer means to thereby generate a reset signal;

(b) an address decoder coupled to the hasher, the address decoder having a builtin Address Table, the address decoder comparing the output of the multiplexer means with the Address Table.

With the foregoing address generator, when the output of the multiplexer means is the Destination Address signal, the address decoder determines whether the reset signal and the Destination Address signal belong to the same group; if yes, the address decoder generating the Destination Address Control signal, the Destination Port signal, the Destination Address. Group signal, and the Destination Address buffer signal; and when the output of the multiplexer means is the Source Address signal, the address decoder determines whether the reset signal and the Source Address signal belong to the same group; if yes, the address decoder generating the Source Address Control signal, the Source Address Group signal, and the Source Address buffer signal.

The foregoing address generator further includes the following constituent elements:

(a) a first buffer, coupled to the address decoder, for temporary storage of the Destination Address Control signal therein;

(b) a second buffer, coupled to the address decoder, for temporary storage of the Destination Port signal therein;

(c) a third buffer, coupled to the address decoder, for temporary storage of the Destination Address Group signal therein;

(d) a fourth buffer, coupled to the address decoder, for temporary storage of the Destination Address buffer signal therein;

(e) a fifth buffer, coupled to the address decoder, for temporary storage of the Source Address Control signal therein;

(f) a sixth buffer, coupled to the address decoder, for temporary storage of the Source Address Group signal therein; and (g) a seventh buffer, coupled to the address decoder, for temporary storage of the Source Address buffer signal therein.

Further in the network switcher of the invention, each of the output interface units includes the following constituent elements:

(a) a package buffer, connected to the associated node of the reception interface unit, for temporary storage of the packet of the incoming node-information signal issued by the associated node;

(b) a Destination Address Latcher, connected to receive the incoming node-information signal, for generating a Destination Address signal;

(c) a Source Address Latcher, connected to receive the incoming node-information signal from the node, for generating a Source Address signal;

(d) multiplexer means, connected to receive the Destination Address signal and the Source Address signal respectively from the Destination Address Latcher and the Source Address Latcher, for selectively outputting the Destination Address signal and the Source Address signal;

(e) an address generator connected to receive the output of the multiplexer means, when the output of the multiplexer means is the Destination Address signal, the address generator generating a Destination Address Control signal, a Destination Port signal, a Destination Address Group signal, and a Destination Address buffer signal; and when the output of the multiplexer means is the Source Address signal, the address generator generating a Source Address Control signal, a Source Address Group signal, and a Source Address buffer signal;

(f) a group decoder, coupled to receive the Destination Address Group signal and the Source Address Group signal from the address generator, for generating a Group check signal indicating whether the Destination Address and the Source Address belong to the same group;

(g) a decoder, coupled to the Destination Address Latcher, the Source Address Latcher, the address generator, and the group decoder, for generating an Output Access Control signal in response to the Destination Address signal, the Source Address signal, the Destination Address Control signal, the Destination Port signal, the Destination Address buffer signal, the Source Address Control signal, the Source Address buffer signal, and the Group check signal; and (h) an output DMA controller, coupled to the decoder, for generating a DMA control signal in response to the Output Access Control signal from the decoder; the package buffer outputting and transferring the packet of the received incoming node-information signal to the destination node in response to the DMA control signal.

In the foregoing output interface unit, the address generator includes the following constituent elements:

(a) a hasher, coupled to the multiplexer means, for processing the output of the multiplexer means to thereby generate a reset signal; and (b) an address decoder coupled to the hasher, the address decoder having a builtin Address Table, the address decoder comparing the output of the multiplexer means with the Address Table.

In the foreign address generator, when the output of the multiplexer means is the Destination Address signal, the address decoder determines whether the reset signal and the Destination Address signal belong to the same group; if yes, the address decoder generating the Destination Address Control signal, the Destination Port signal, the Destination Address Group signal, and the Destination Address buffer signal; and when the output of the multiplexer means is the Source Address signal, the address decoder determines whether the reset signal and the Source Address signal belong to the same group; if yes, the address decoder generating the Source Address Control signal, the Source Address Group signal, and the Source Address buffer signal.

In addition, the foregoing address generator includes the following constituent elements:

(a) a first buffer, coupled to the address decoder, for temporary storage of the Destination Address Control signal therein;

(b) a second buffer, coupled to the address decoder, for temporary storage of the Destination Port signal therein;

(c) a third buffer, coupled to the address decoder, for temporary storage of the Destination Address buffer signal therein;

(d) a fourth buffer, coupled to the address decoder, for temporary storage of the Source Address Control signal therein;

(e) a fifth buffer, coupled to the address decoder, for temporary storage of the Source Address Group signal therein; and (f) a sixth buffer, coupled to the address decoder, for temporary storage of the Source Address buffer signal therein.

One major feature of the foregoing network switcher of the invention is that it can prevent a node-information signal whose destination address is not yet acknowledged from being transferred to all of the other interface ports beside the destination one. Conventionally, this drawback significantly degrades the performance of the overall network system. This network switcher allows an improvement on the performance of network systems that has a number of nodes.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENT

The network switcher of the invention is used for transferring node-information signals between a network communication unit and a plurality of nodes. In accordance with the invention, the MAC addresses and the interface ports in the network system are divided into groups, and the transfer of node-information signal between a source and a destination is valid only if the source and the destination belong to the same group. The node-information signals that are to be transferred are incorporated with a group mode that indicates a particular group the source belongs. The network switcher includes at least one reception interface unit which can determine which group a received node-information signal belongs. If the source and destination of the node-information signal belong to the same group, the reception interface unit will allow the transfer of the node-information signal to destination. Otherwise, the transfer will be rejected.

The output interface unit of the network switcher receives incoming node-information signals from the network communication unit, and then forwards the node-information signals to their destinations if the destination and the source belong to the same group. This allows the network switcher to have the feature of the so-called virtual local area network (VLAN). In a VLAN, a selected number of interface ports or MAC addresses are defined as one group. The data transfer is permitted only within the same group.

Preferred embodiments of the invention will be described in detail in the following with reference to FIGS. 5 through 8. The network switcher of the invention is also based on the system configuration of FIG. 1.

Figure 5:
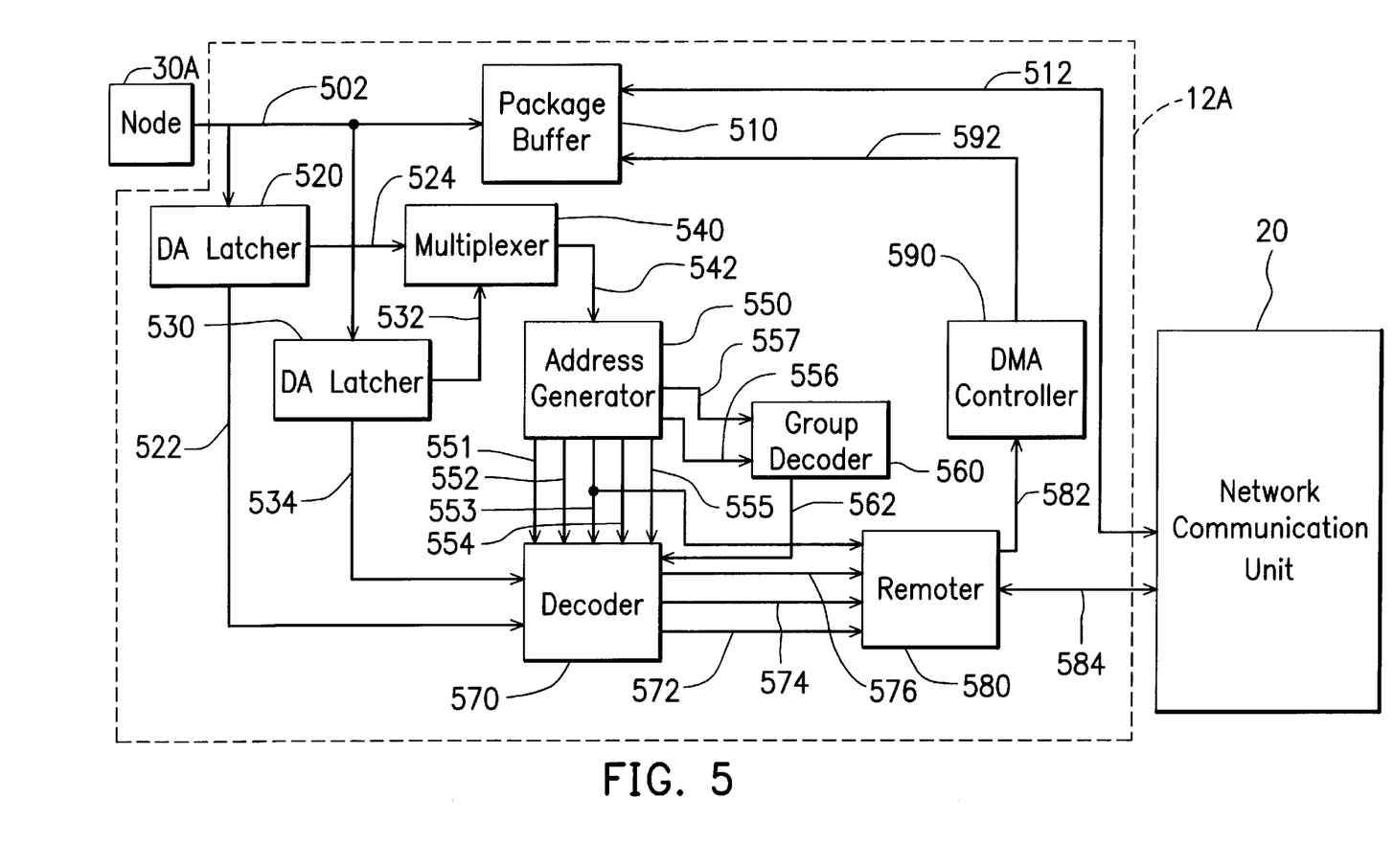
FIG. 5 is a schematic block diagram showing the detailed structure of the reception interface unit used in the network switcher of the invention.

FIG. 5 is a schematic block diagram showing the detailed structure of the reception interface unit 12A used in the network switcher of the invention. This reception interface unit 12A is used to receive an outgoing node-information signal from a certain local node, for example the node 30A, and then transfer the node-information signal to the network communication unit 20. The reception interface unit 12A includes a package buffer 510, a Destination Address (DA) Latcher 520, a Source Address (SA) Latcher 530, a multiplexer 540, an address generator 550, a group decoder 560, a decoder 570, a remoter 580, and a DMA (direct memory access) controller 590.

When a certain node in the network system, for example the node 30A, wants to transfer information via the network switcher to another node, it issues and transfers a node-information signal in packet form simultaneously via the data line 502 to the package buffer 510, the DA Latcher 520, and the SA Latcher 530. The package buffer 510 stores the received node-information temporarily therein, while in response to the received node-information signal, the DA Latcher 520 generates a Destination Address (DA) signal arid a Destination Address Latch (DA_Latch) signal which are respectively transferred via the signal line 524 to the multiplexer 540 and via the signal line 522 to the decoder 570. The SA Latcher 530 is used to store the source address (in this case, the address of the node 30A) of the node-information signal; and in response to the node-information signal, the SA Latcher 530 generates a Source Address (SA) signal and a Source Address Latch (SA_Latch) signal which are then transferred respectively via the signal line 532 to the multiplexer 540 and via the signal line 534 to the decoder 570.

The multiplexer 540 receives the DA signal and the SA signal respectively from the DA Latcher 520 and SA Latcher 530 and outputs the DA and SA signals in a sequential manner to the address generator 550. This allows the DA signal and the SA signal to share a common address generator, i.e., the address generator 550, so that hardware cost can be reduced.

Via the multiplexer 540, the address generator 550 receives the DA signal from the DA Latcher 520 or the SA signal from the SA Latcher 530 in a sequential manner.

In response to the DA signal, the address generator 550 generates a Destination Address Control (DA_Control) signal, a Destination Port (DP) signal, a Destination Address Group (DA_Group) signal, and a Destination Address (DA) buffer signal.

In response to the SA signal, the address generator 550 generates a Source Address Control (SA_Control) signal, a Source Address Group (SA_Group) signal, and a Source Address (SA) buffer signal.

The group decoder 560 receives the DA_Group signal and the SA_Group signal respectively via the signal lines 556, 557 from the address generator 550. In response to these signals, the group decoder 560 generates a Group check signal indicating whether the source and the destination belong to the same group.

The decoder 570 receives the DA_Latch signal via the signal line 522 from the DA Latcher 520 and the SA_Latch signal via the signal line 534 from the SA Latcher 530, and also the DA signal, the DA_Control signal, the DP signal, and the DA buffer signal (in the case of connecting the address generator 550 via the multiplexer 540 to the DA Latcher 520) or the SA signal, the SA_Control signal, and the SA buffer signal (in the case of connecting the address generator 550 via the multiplexer 540 to the SA Latcher 530) via the signal lines 551, 552, 553, 554. In response to these signals, the decoder 570 generates a Remote-pkt signal, a Local-pkt signal, and a Broadcast-pkt signal in accordance with a particular decoding algorithm. The Broadcast-pkt signal indicates whether the node-information signal is to be forwarded to all of the linked ports; the Remote-pkt signal indicates whether the node-information signal is to be forwarded to a single specified port; and the Local-pkt signal indicates whether the node-information signal is not to be forwarded and restricted for local use. In this preferred embodiment, the decoder 570 generates a Remote-pkt signal, a Local-pkt signal, and a Broadcast-pkt signal in accordance with the following decoding algorithm:

Remote-pkt=(DA_Control signal valid) &
        (DP is not the port ID of this node) &
        (DA=DA_Latch) &
        (SA_Control signal valid) &
        (SA=SA_Latch)
        Group check signal is logic-1
    Local-pkt=(obtained by other decoding method)
    Broadcast-pkt=$\phi$ (not in use all the time)

To determine whether the Destination Address and the Source Address belong to the same group, the group decoder 560 performs the following decoding algorithm:

Group check signal=(DA_Group=SA_Group)

The remoter 580 receives the DP buffer signal via the signal line 555 from the address generator 550, and also the Broadcast-pkt signal, Remote-pkt signal, and Local-pkt signal respectively via the signal lines 572, 574, 576 from the decoder 570. In response to these signals, the remoter 580 generates and transfers a Remote Control signal via the signal line 584 to the network communication unit 20 and a Remote-Access Control signal via the signal line 582 to the DMA controller 590. In response to the Remote-Access Control signal, the DMA controller 590 generates and transfers a DMA control signal via the signal line 592 to the package buffer 510. In response to the DMA control signal, the package buffer 510 outputs and transfers the packet of the earlier received node-information signal via the data line 512 to the network communication unit 20 which then forwards the packet to the destination. After the data transfer is completed, the network communication unit 20 will return a confirmation signal to the remoter 580.

Figure 6:
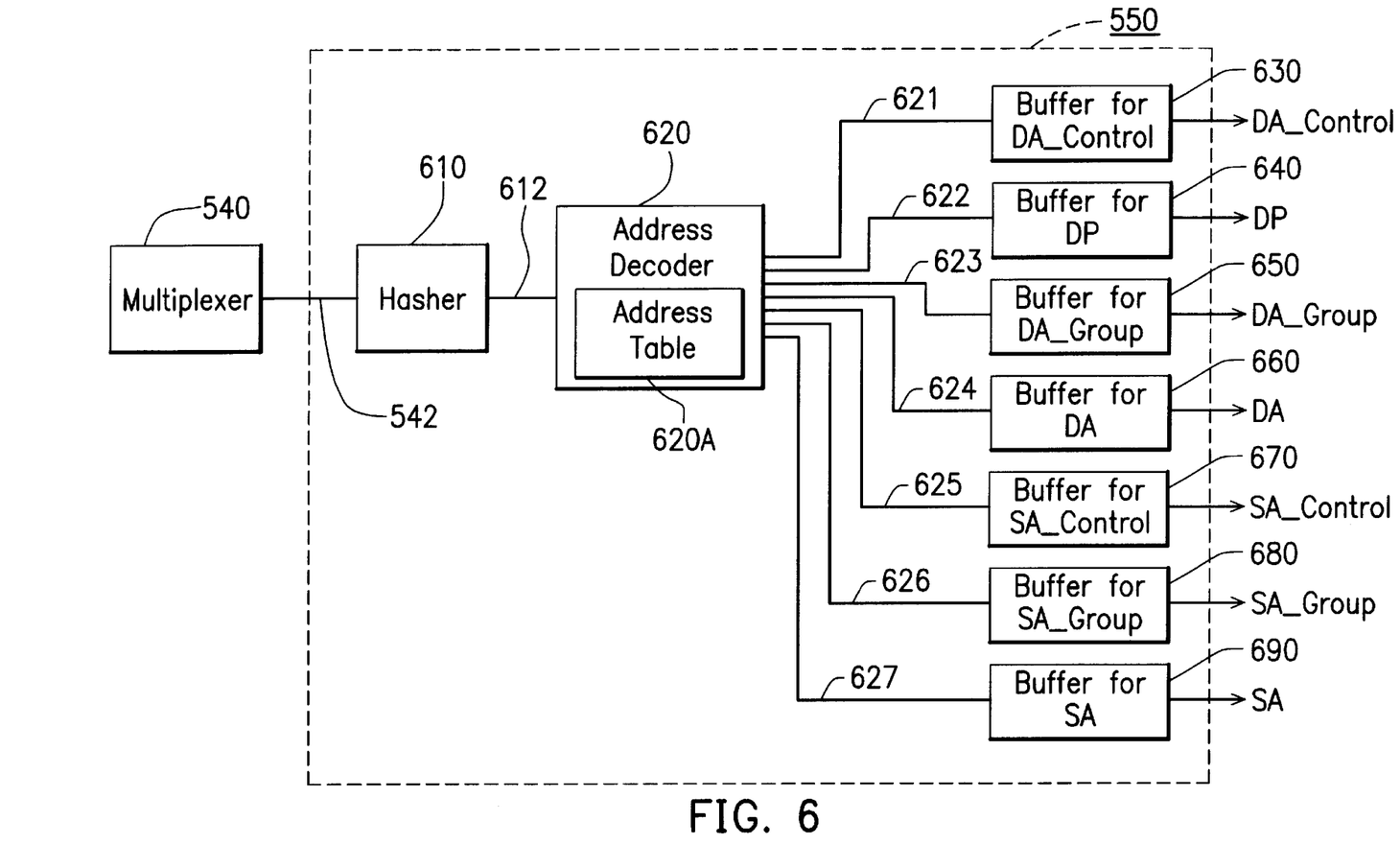
FIG. 6 is a schematic block diagram showing a more detailed structure of the address generator used in the reception interface unit shown in FIG. 5.

FIG. 6 is a schematic block diagram showing a more detailed structure of the address generator 550 used in the reception interface unit shown in FIG. 5. As shown, the address generator 550 includes a hasher 610, an address decoder 620 having a built-in Address Table 620A, and a plurality of buffers 630, 640, 650, 660, 670, 680, 690. The hasher 610 receives and processes the output of the multiplexer 540 (the DA signal and the SA signal) to thereby generate and transfer a reset signal via the signal line 612 to the address decoder 620.

When the output of the multiplexer 540 is the DA signal, the address decoder 620 compares the reset signal with the Address Table 620A to see if the Destination Address and the source node issuing the node-information signal belong to the same group. If YES, the address decoder 620 generates and transfers a DA_Control signal, a DP signal, a DA_Group signal, and a DA buffer signal respectively via the signal lines 621, 622, 623, 624 to the four buffers 630, 640, 650, 660.

When the output of the multiplexer 540 is the SA signal, the address decoder 620 compares the reset signal with the Address Table 620A to see if the Source Address and the destination node belong to the same group. If YES, the address decoder 620 generates and transfers an SA_Control signal, an SA_Group signal, and an SA buffer signal respectively via the signal lines 625, 626, 627 to the three buffers 670, 680, 690.

These buffers 630, 640, 650, 660, 670, 680, 690 are used for temporary storage of the DA_Control signal, the DP signal, the DA_Group signal, and the DA buffer signal in the case of the multiplexer 540 outputting a DA signal, and the SA_Control signal, the SA_Group signal, and the SA buffer signal in the case of the multiplexer 540 outputting an SA signal.

Figure 7:
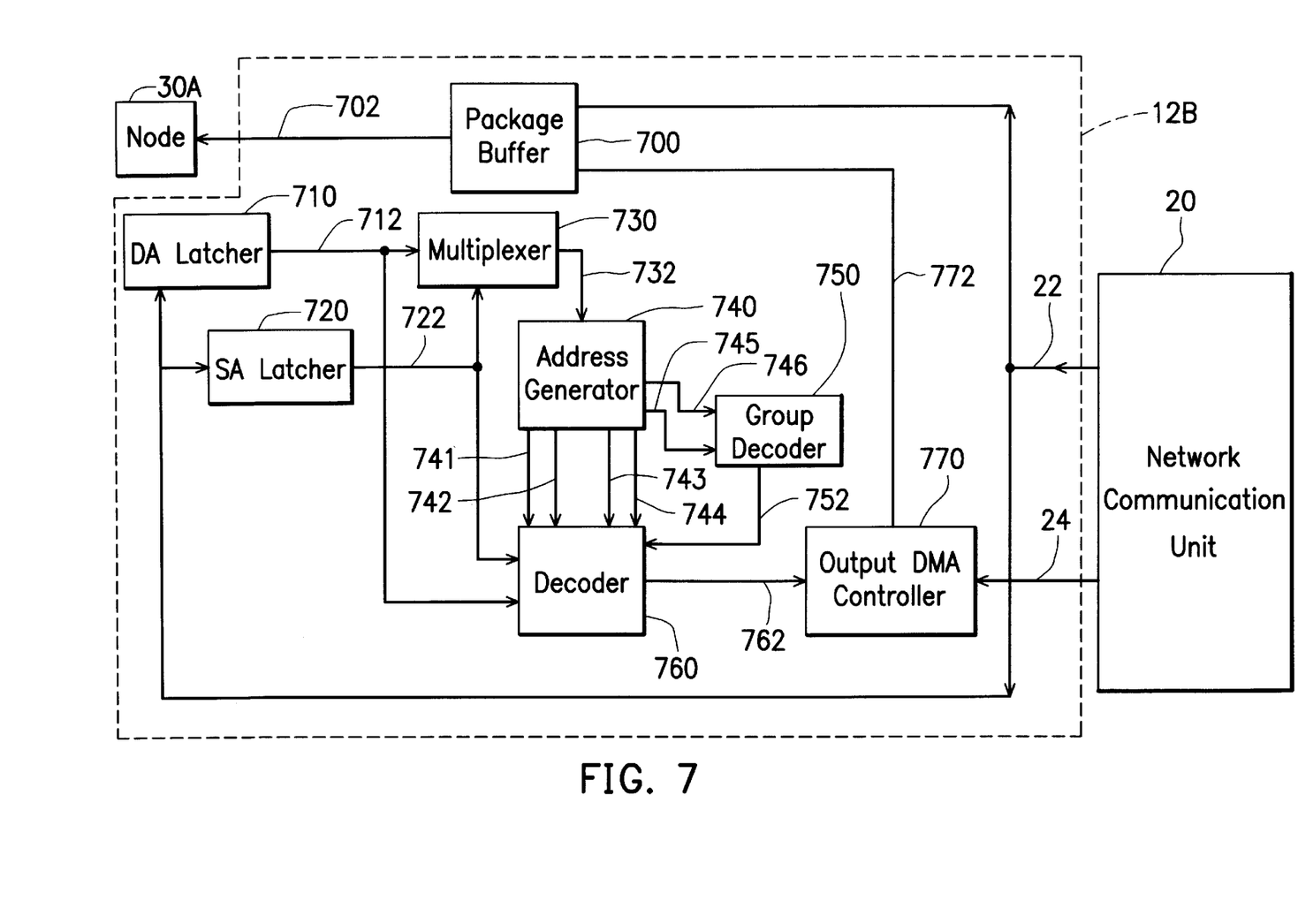
FIG. 7 is a schematic block diagram showing the detailed structure of the output interface unit used in the network switcher of the invention.

When the network communication unit 20 receives an incoming node-information signal whose destination is one of the nodes in the network system, for example the node 30A, the node-information signal is processed and forwarded through one of the output interface units 12B in the network switcher.

Referring to FIG. 7, each output interface unit 12B includes a package buffer 700, a Destination Address (DA) Latcher 710, a Source Address (SA) Latcher 720, a multiplexer 730, an address generator 740, a group decoder 750, a decoder 760, and an output DMA controller 770.

When the network communication unit 20 receives an incoming node-information signal from t remote node, the packet of the node-information signal is initially forwarded via the data line 22 to the package buffer 700 and stored temporarily in the same. Meanwhile, the node-information signal is transferred to both of the DA Latcher 710 and the SA Latch r 720. The DA Latcher 710 latches the Destination Address of the received node-information signal, while the SA Latcher 720 latches the Source Address of the same. The output of the DA Latcher 710, referred to as Destination Address (DA) signal, and the output of the SA Latcher 720, referred to as Source Address (SA) signal, are transferred via the signal lines 712, 722 to the multiplexer 730 which outputs these two signals in a sequential manner to the address generator 740. This allows the DA signal and the SA signal to share a common address generator, i.e., the address generator 740, so that hardware cost can be reduced. The output of the multiplexer 730 is transferred via the signal line 732 to the address generator 740.

In response to the DA signal, the address generator 740 generates a Destination Address Control (DA_Control) signal, a Destination Port (DP) signal, a Destination Address Group (DA_Group) signal, and a Destination Address (DA) buffer signal.

In response to the SA signal, the address generator 740 generates a Source Address Control (SA_Control) signal, a Source Address Group (SA_Group) signal, and a Source Address (SA) buffer signal.

The DA_Group signal is transferred via the signal line 745 to the group decoder 750, while the SA_Group signal is transferred via the signal line 746 to the same. The group decoder 750 then compares the DA_Group signal with the SA_Group signal to thereby generate a Group check signal indicating whether the Destination Address and the Source Address belong to the same group.

Meanwhile, the decoder 760 receives the DA signal via the signal line 712 from the DA Latcher 710 and the SA signal via the signal line 722 from the SA Latcher 720, and also the DA_Control signal, the DP signal, the DA buffer signal, the SA_Control signal, and the SA buffer signal via the signal lines 741, 742, 743, 744 from the address generator 740 and the Group check signal via the signal line 752 from the group decoder 750. In response to these signals, the decoder 760 generates an Output Access Control signal which contains a Valid-pkt signal indicative of whether the received node-information signal is a valid packet in accordance with the following algorithm:

Valid-pkt=(DA_Control signal valid) &
(DP=DA_Latch) &
(SA_Latch signal valid) &
(SA=SA_Latch) &
Group check signal is logic-1

The Group check signal is used to indicate whether the Destination Address and the Source Address of the received node-information signal belong to the same group, which is obtained in accordance with the following algorithm:

Group check signal=(DA_Group=SA_Group)

The output DMA controller 770 receives the output of the decoder 760 via the signal line 762. Meanwhile, the output DMA controller 770 receives a network transfer signal via the signal line 24 from the network communication unit 20. If the packet of the received node-information signal is valid (Valid-pkt=1), the output DMA controller 770 generates and transfers a DMA control signal via the signal line 772 to the package buffer 700. In response to the DMA control signal, the package buffer 700 outputs and transfers the packet of the earlier received node-information signal via the data line 702 to the node 30A (the destination). This completes the transfer of the node-information signal from the remote node (the source) to the local node 30A (the destination).

Figure 8:
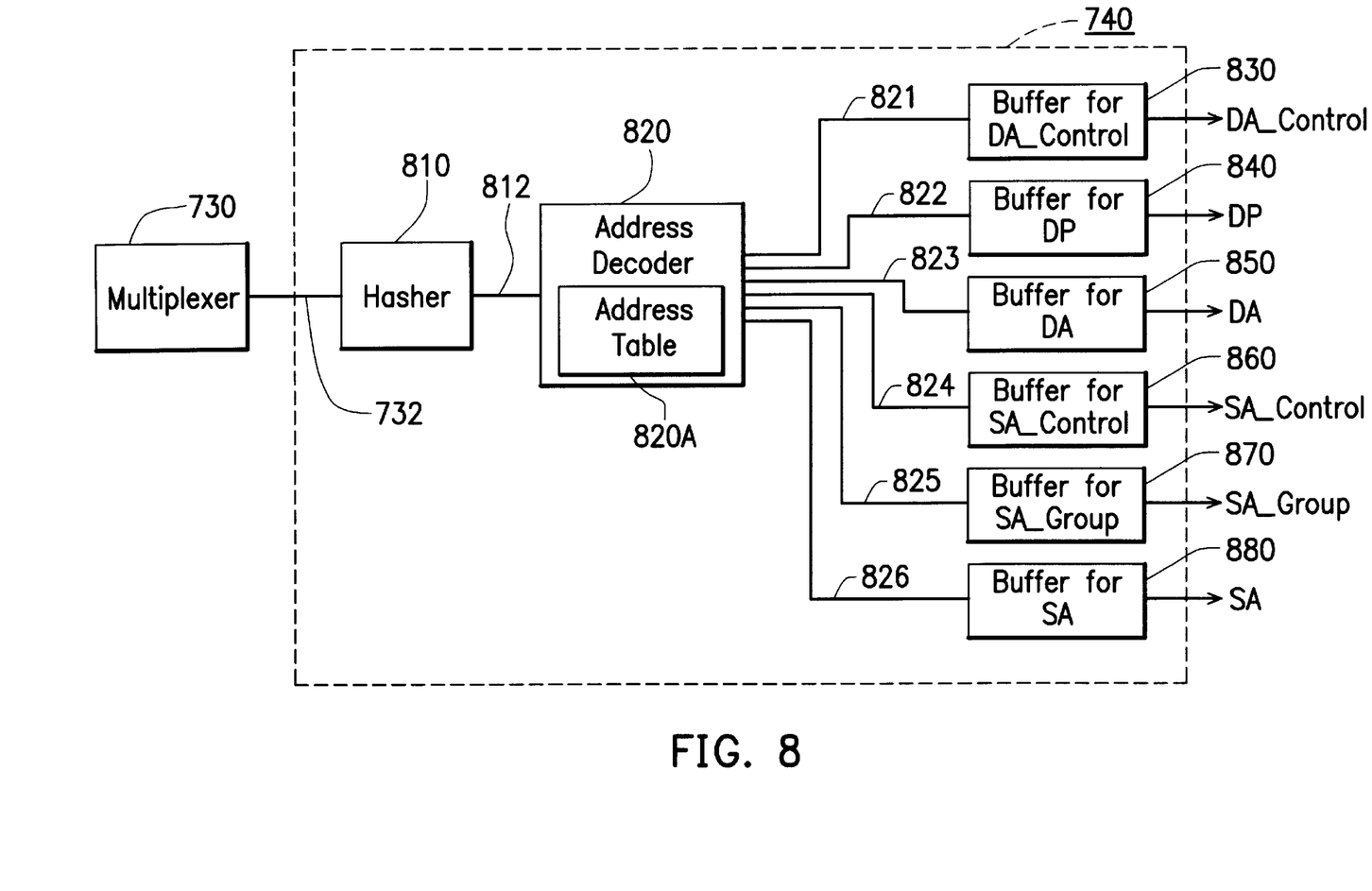
FIG. 8 is a schematic block diagram showing a more detailed structure of the address generator used in the output interface unit shown in FIG. 7.

FIG. 8 is a schematic block diagram showing a more detailed structure of the address generator 740 used in the output interface unit 12B shown in FIG. 7. As shown, the address generator 740 includes a hasher 810, an address decoder 820 having a built-in Address Table 820A, and a plurality of buffers 830, 840, 850, 860, 870, 880. The hasher 810 receives the output of the multiplexer 730 (the DA signal and then the SA signal) via the signal line 732, processes it, and then generates and transfers a reset signal via the signal line 812 to the address decoder 820.

When the output of the multiplexer 730 is the DA signal, the address decoder 820 compares the reset signal with the Address Table 820A to see if the reset signal and the DA signal belong to the same group. If YES, the address decoder 820 generates a Destination Address Control (DA_Control) signal, a Destination Port (DP) signal, and a Destination Address (DA) buffer signal, which are transferred respectively via the signal lines 821, 822, 823 to the three buffers 830, 840, 850 to be stored temporarily therein.

When the output of the multiplexer 730 is the SA signal, the address decoder 820 compares the reset signal the Address Table 820A to see if the reset signal and the SA signal belong to the same group. If YES, the address decoder 820 generates a Source Address Control (SA_Control) signal, a Source Address Group (SA_Group) signal, and a Source Address (SA) buffer signal, which are transferred respectively via the signal lines 824, 825, 826 to the three buffers 860, 870, 880 to be stored temporarily therein.

In conclusion, the invention provides a network switcher with the feature of VLAN which defines a certain number of interface ports or MAC addresses as a group, and the transfer of data is permitted only within the same group. In conventional Ethernet-based network switchers, the packet, if its destination address is unknown or it is a broadcast, will be transferred to all of the interface ports in the network system, which causes a delay in the data transfer, and thus a reduction in the system performance. Compared to the prior art, the invention can solve this problem by allowing the data transfer to be permitted only for sources and destinations within the same group. The system performance of the network system can thus be enhanced.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A network switcher for transferring data between a network communication unit and a plurality of nodes, each node issuing a node-information signal to the network switcher when the node wants to transfer data to a remote node, said network switcher comprising:

a plurality of reception interface units, each being coupled between the network communication unit and one of the nodes, for transferring data from the nodes to the network communication unit; when receiving a node-information signal from the associated node, each reception interface unit being capable of determining whether the node and the destination of the node-information signal belong to the same group; if yes, said reception interface unit allowing the transfer of the node-information signal to the network communication unit; and a plurality of output interface units, each being coupled between the network communication unit and one of the nodes, for transferring data from the network communication unit to the nodes; when receiving an incoming node-information signal from the network communication unit that is to be transferred to a certain node connected to the network switcher, each output interface unit being capable of determining whether the destination and the source of the incoming node-information signal belong to the same group; if yes, said output interface unit allowing the transfer of the incoming node-information signal to the destination node;

wherein each of said reception interface units includes:

a package buffer, connected to the associated node of the reception interface unit, for temporary storage of the packet of the node-information signal issued by the associated node, a Destination Address Latcher, connected to receive the node-information signal from the node, for generating a Destination Address signal and a Destination Address Latch signal, a Source Address Latcher, connected to receive the node-information signal from the node, for generating a Source Address signal, multiplexer means, connected to receive the Destination Address signal and the Source Address signal respectively from said Destination Address Latcher and said Source Address Latcher, for selectively outputting the Destination Address signal and the Source Address signal, an address generator connected to receive the output of said multiplexer means, when the output of said multiplexer means is the Destination Address signal, said address generator generating a Destination Address Control signal, a Destination Port signal, a Destination Address Group signal, and a Destination Address buffer signal; and when the output of said multiplexer means is the Source Address signal, said address generator generating a Source Address Control signal, a Source Address Group signal, and a Source Address buffer signal, a group decoder, coupled to receive the Destination Address Group signal and the Source Address Group signal from said address generator, for generating a Group check signal indicating whether the Destination Address and the Source Address belong to the same group, a decoder, coupled to said Destination Address Latcher, said Source Address Latcher, said address generator, and said group decoder, for generating either a Remote-pkt signal, a Local-pkt signal, or a Broadcast-pkt signal in response to the Destination Address Latch signal, the Source Address Latch signal, the Destination Address Control signal, the Destination Port signal, the Destination Address buffer signal, the Source Address Control signal, the Source Address buffer signal, and the Group check signal, a remoter, coupled to said address generator and said decoder, for generating a Remote Control signal and a Remote-Access Control signal in response to the Destination Port signal and either the Local-pkt signal, the Broadcast-pkt signal, or the Broadcast-pkt signal, and DMA controller, coupled to the remoter, for generating and transfers a DMA control signal to said package buffer in response to the Remote-Access Control signal from said remoter, said package buffer outputting and transferring the packet of the received node-information signal to the destination node in response to the DMA control signal.

2. The network switcher of claim 1, wherein said address generator includes:

a hasher, coupled to said multiplexer means, for processing the output of said multiplexer means to thereby generate a reset signal; and an address decoder coupled to said hasher, said address decoder having a built-in Address Table, said address decoder comparing the output of said multiplexer means with the Address Table;

wherein when the output of said multiplexer means is the Destination Address signal, said address decoder determines whether the reset signal and the Destination Address signal belong to the same group; if yes, said address decoder generating the Destination Address Control signal, the Destination Port signal, the Destination Address Group signal, and the Destination Address buffer signal; and when the output of said multiplexer means is the Source Address signal, said address decoder determines whether the reset signal and the Source Address signal belong to the same group; if yes, said address decoder generating the Source Address Control signal, the Source Address Group signal, and the Source Address buffer signal.

3. The network switcher of claim 2, wherein said address generator further includes:

a first buffer, coupled to said address decoder, for temporary storage of the Destination Address Control signal therein;

a second buffer, coupled to said address decoder, for temporary storage of the Destination Port signal therein;

a third buffer, coupled to said address decoder, for temporary storage of the Destination Address Group signal therein;

a fourth buffer, coupled to said address decoder, for temporary storage of the Destination Address buffer signal therein;

a fifth buffer, coupled to said address decoder, for temporary storage of the Source Address Control signal therein;

a sixth buffer, coupled to said address decoder, for temporary storage of the Source Address Group signal therein; and a seventh buffer, coupled to said address decoder, for temporary storage of the Source Address buffer signal therein.

4. A network switcher for transferring data between a network communication unit and a plurality of nodes, each node issuing a node-information signal to the network switcher when the node wants to transfer data to a remote node, said network switcher comprising:

a plurality of reception interface units, each being coupled between the network communication unit and one of the nodes, for transferring data from the nodes to the network communication unit; when receiving a node-information signal from the associated node, each reception interface unit being capable of determining whether the node and the destination of the node-information signal belong to the same group; if yes, said reception interface unit allowing the transfer of the node-information signal to the network communication unit; and a plurality of output interface units, each being coupled between the network communication unit and one of the nodes, for transferring data from the network communication unit to the nodes; when receiving an incoming node-information signal from the network communication unit that is to be transferred to a certain node connected to the network switcher, each output interface unit being capable of determining whether the destination and the source of the incoming node-information signal belong to the same group; if yes, said output interface unit allowing the transfer of the incoming node-information signal to the destination node;

a package buffer, connected to the associated node of the reception interface unit, for temporary storage of the packet of the incoming node-information signal issued by the associated node, a Destination Address Latcher, connected to receive the incoming node-information signal, for generating a Destination Address signal, a Source Address Latcher, connected to receive the incoming node-information signal from the node, for generating a Source Address signal, multiplexer means, connected to receive the Destination Address signal and the Source Address signal respectively from said Destination Address Latcher and said Source Address Latcher, for selectively outputting the Destination Address signal and the Source Address signal, an address generator connected to receive the output of said multiplexer means, when the output of said multiplexer means is the Destination Address signal, said address generator generating a Destination Address Control signal, a Destination Port signal, a Destination Address Group signal, and a Destination Address buffer signal; and when the output of said multiplexer means is the Source Address signal, said address generator generating a Source Address Control signal, a Source Address Group signal, and a Source Address buffer signal, a group decoder, coupled to receive the Destination Address Group signal and the Source Address Group signal from said address generator, for generating a Group check signal indicating whether the Destination Address and the Source Address belong to the same group, a decoder, coupled to said Destination Address Latcher, said Source Address Latcher, said address generator, and said group decoder, for generating an Output Access Control signal in response to the Destination Address signal, the Source Address signal, the Destination Address Control signal, the Destination Port signal, the Destination Address buffer signal, the Source Address Control signal, the Source Address buffer signal, and the Group check signal, and an output DMA controller, coupled to said decoder, for generating a DMA control signal in response to the Output Access Control signal from said decoder, said package buffer outputting and transferring the packet of the received incoming node-information signal to the destination node in response to the DMA control signal.

5. The network switcher of claim 4, wherein said address generator includes:

a hasher, coupled to said multiplexer means, for processing the output of said multiplexer means to thereby generate a reset signal; and an address decoder coupled to said hasher, said address decoder having a built-in Address Table, said address decoder comparing the output of said multiplexer means with the Address Table;

wherein when the output of said multiplexer means is the Destination Address signal, said address decoder determines whether the reset signal and the Destination Address signal belong to the same group; if yes, said address decoder generating the Destination Address Control signal, the Destination Port signal, the Destination Address Group signal, and the Destination Address buffer signal; and when the output of said multiplexer means is the Source Address signal, said address decoder determines whether the reset signal and the Source Address signal belong to the same group; if yes, said address decoder generating the Source Address Control signal, the Source Address Group signal, and the Source Address buffer signal.

6. The network switcher of claim 5, wherein said address generator further includes:

a first buffer, coupled to said address decoder, for temporary storage of the Destination Address Control signal therein;

a second buffer, coupled to said address decoder, for temporary storage of the Destination Port signal therein;

a third buffer, coupled to said address decoder, for temporary storage of the Destination Address buffer signal therein;

a fourth buffer, coupled to said address decoder, for temporary storage of the Source Address Control signal therein;

a fifth buffer, coupled to said address decoder, for temporary storage of the Source Address Group signal therein; and a sixth buffer, coupled to said address decoder, for temporary storage of the Source Address buffer signal therein.

7. A network switcher for transferring data between a network communication unit and a plurality of nodes, each node issuing a node-information signal to the network switcher when the node wants to transfer data to a remote node, said network switcher comprising:

a plurality of reception interface units, each being coupled between the network communication unit and one of the nodes, for transferring data from the nodes to the network communication unit; when receiving a node-information signal from the associated node, each reception interface unit being capable of determining whether the node and the destination of the node-information signal belong to the same group; if yes, said reception interface unit allowing the transfer of the node-information signal to the network communication unit; and a plurality of output interface units, each being coupled between the network communication unit and one of the nodes, for transferring data from the network communication unit to the nodes; when receiving an incoming node-information signal from the network communication unit that is to be transferred to a certain node connected to the network switcher, each output interface unit being capable of determining whether the destination and the source of the incoming node-information signal belong to the same group; if yes, said output interface unit allowing the transfer of the incoming node-information signal to the destination node;

wherein each of said reception interface units includes:

a package buffer, connected to the associated node of the reception interface unit, for temporary storage of the packet of the node-information signal issued by the associated node;

a Destination Address Latcher, connected to receive the node-information signal from the node, for generating a Destination Address signal and a Destination Address Latch signal;

a Source Address Latcher, connected to receive the node-information signal from the node, for generating a Source Address signal;

multiplexer means, connected to receive the Destination Address signal and the Source Address signal respectively from said Destination Address Latcher and said Source Address Latcher, for selectively outputting the Destination Address signal and the Source Address signal;

an address generator connected to receive the output of said multiplexer means, when the output of said multiplexer means is the Destination Address signal, said address generator generating a Destination Address Control signal, a Destination Port signal, a Destination Address Group signal, and a Destination Address buffer signal; and when the output of said multiplexer means is the Source Address signal, said address generator generating a Source Address Control signal, a Source Address Group signal, and a Source Address buffer signal;

a group decoder, coupled to receive the Destination Address Group signal and the Source Address Group signal from said address generator, for generating a Group check signal indicating whether the Destination Address and the Source Address belong to the same group;

a decoder, coupled to said Destination Address Latcher, said Source Address Latcher, said address generator, and said group decoder, for generating either a Remote-pkt signal, a Local-pkt signal, or a Broadcast-pkt signal in response to the Destination Address Latch signal, the Source Address Latch signal, the Destination Address Control signal, the Destination Port signal, the Destination Address buffer signal, the Source Address Control signal, the Source Address buffer signal, and the Group check signal;

a remoter, coupled to said address generator and said decoder, for generating a Remote Control signal and a Remote-Access Control signal in response to the Destination Port signal and either the Local-pkt signal, the Broadcast-pkt signal, or the Broadcast-pkt signal; and a DMA controller, coupled to the remoter, for generating and transfers a DMA control signal to said package buffer in response to the Remote-Access Control signal from said remoter;

said package buffer outputting and transferring the packet of the received node-information signal to the destination node in response to the DMA control signal.

8. The network switcher of claim 7, wherein each of said output interface units includes:

a package buffer, connected to the associated node of the reception interface unit, for temporary storage of the packet of the incoming node-information signal issued by the associated node;

a Destination Address Latcher, connected to receive the incoming node-information signal, for generating a Destination Address signal;

a Source Address Latcher, connected to receive the incoming node-information signal from the node, for generating a Source Address signal;

multiplexer means, connected to receive the Destination Address signal and the Source Address signal respectively from said Destination Address Latcher and said Source Address Latcher, for selectively outputting the Destination Address signal and the Source Address signal;

an address generator connected to receive the output of said multiplexer means, when the output of said multiplexer means is the Destination Address signal, said address generator generating a Destination Address Control signal, a Destination Port signal, a Destination Address Group signal, and a Destination Address buffer signal; and when the output of said multiplexer means is the Source Address signal, said address generator generating a Source Address Control signal, a Source Address Group signal, and a Source Address buffer signal;

a group decoder, coupled to receive the Destination Address Group signal and the Source Address Group signal from said address generator, for generating a Group check signal indicating whether the Destination Address and the Source Address belong to the same group;

a decoder, coupled to said Destination Address Latcher, said Source Address Latcher, said address generator, and said group decoder, for generating an Output Access Control signal in response to the Destination Address signal, the Source Address signal, the Destination Address Control signal, the Destination Port signal, the Destination Address buffer signal, the Source Address Control signal, the Source Address buffer signal, and the Group check signal;

an output DMA controller, coupled to said decoder, for generating a DMA control signal in response to the Output Access Control signal from said decoder;

said package buffer outputting and transferring the packet of the received incoming node-information signal to the destination node in response to the DMA control signal.

9. The network switcher of claim 8, wherein said address generator includes:

a hasher, coupled to said multiplexer means, for processing the output of said multiplexer means to thereby generate a reset signal; and an address decoder coupled to said hasher, said address decoder having a built-in Address Table, said address decoder comparing the output of said multiplexer means with the Address Table;

wherein when the output of said multiplexer means is the Destination Address signal, said address decoder determines whether the reset signal and the Destination Address signal belong to the same group; if yes, said address decoder generating the Destination Address Control signal, the Destination Port signal, the Destination Address Group signal, and the Destination Address buffer signal; and when the output of said multiplexer means is the Source Address signal, said address decoder determines whether the reset signal and the Source Address signal belong to the same group; if yes, said address decoder generating the Source Address Control signal, the Source Address Group signal, and the Source Address buffer signal.

10. The network switcher of claim 9, wherein said address generator further includes:

a first buffer, coupled to said address decoder, for temporary storage of the Destination Address Control signal therein;

a second buffer, coupled to said address decoder, for temporary storage of the Destination Port signal therein;

a third buffer, coupled to said address decoder, for temporary storage of the Destination Address buffer signal therein;

a fourth buffer, coupled to said address decoder, for temporary storage of the Source Address Control signal therein;

a fifth buffer, coupled to said address decoder, for temporary storage of the Source Address Group signal therein; and a sixth buffer, coupled to said address decoder, for temporary storage of the Source Address buffer signal therein.

11. A network switcher for transferring data between a network communication unit and a plurality of nodes, each node issuing a node-information signal to the network switcher when the node wants to transfer data to a remote node, said network switcher comprising:

a plurality of reception interface units, each being coupled between the network communication unit and one of the nodes, for transferring data from the nodes to the network communication unit; when receiving a node-information signal from the associated node, each reception interface unit being capable of determining whether the node and the destination of the node-information signal belong to the same group; if yes, said reception interface unit allowing the transfer of the node-information signal to the network communication unit; and a plurality of output interface units, each being coupled between the network communication unit and one of the nodes, for transferring data from the network communication unit to the nodes; when receiving an incoming node-information signal from the network communication unit that is to be transferred to a certain node connected to the network switcher, each output interface unit being capable of determining whether the destination and the source of the incoming node-information signal belong to the same group; if yes, said output interface unit allowing the transfer of the incoming node-information signal to the destination node;

wherein each of said output interface units includes:

a package buffer, connected to the associated node of the reception interface unit, for temporary storage of the packet of the incoming node-information signal issued by the associated node;

a Destination Address Latcher, connected to receive the incoming node-information signal, for generating a Destination Address signal;

a Source Address Latcher, connected to receive the incoming node-information signal from the node, for generating a Source Address signal;

multiplexer means, connected to receive the Destination Address signal and the Source Address signal respectively from said Destination Address Latcher and said Source Address Latcher, for selectively outputting the Destination Address signal and the Source Address signal;

an address generator connected to receive the output of said multiplexer means, when the output of said multiplexer means is the Destination Address signal, said address generator generating a Destination Address Control signal, a Destination Port signal, a Destination Address Group signal, and a Destination Address buffer signal; and when the output of said multiplexer means is the Source Address signal, said address generator generating a Source Address Control signal, a Source Address Group signal, and a Source Address buffer signal;

a group decoder, coupled to receive the Destination Address Group signal and the Source Address Group signal from said address generator, for generating a Group check signal indicating whether the Destination Address and the Source Address belong to the same group;

a decoder, coupled to said Destination Address Latcher, said Source Address Latcher, said address generator, and said group decoder, for generating an Output Access Control signal in response to the Destination Address signal, the Source Address signal, the Destination Address Control signal, the Destination Port signal, the Destination Address buffer signal, the Source Address Control signal, the Source Address buffer signal, and the Group check signal;

an output DMA controller, coupled to said decoder, for generating a DMA control signal in response to the Output Access Control signal from said decoder;

said package buffer outputting and transferring the packet of the received incoming node-information signal to the destination node in response to the DMA control signal.

12. The network switcher of claim 11, wherein each of said reception interface units includes:

a package buffer, connected to the associated node of the reception interface unit, for temporary storage of the packet of the node-information signal issued by the associated node;

a Destination Address Latcher, connected to receive the node-information signal from the node, for generating a Destination Address signal and a Destination Address Latch signal;

a Source Address Latcher, connected to receive the node-information signal from the node, for generating a Source Address signal;

multiplexer means, connected to receive the Destination Address signal and the Source Address signal respectively from said Destination Address Latcher and said Source Address Latcher, for selectively outputting the Destination Address signal and the Source Address signal;

an address generator connected to receive the output of said multiplexer means, when the output of said multiplexer means is the Destination Address signal, said address generator generating a Destination Address Control signal, a Destination Port signal, a Destination Address Group signal, and a Destination Address buffer signal; and when the output of said multiplexer means is the Source Address signal, said address generator generating a Source Address Control signal, a Source Address Group signal, and a Source Address buffer signal;

a group decoder, coupled to receive the Destination Address Group signal and the Source Address Group signal from said address generator, for generating a Group check signal indicating whether the Destination Address and the Source Address belong to the same group;

a decoder, coupled to said Destination Address Latcher, said Source Address Latcher, said address generator, and said group decoder, for generating either a Remote-pkt signal, a Local-pkt signal, or a Broadcast-pkt signal in response to the Destination Address Latch signal, the Source Address Latch signal, the Destination Address Control signal, the Destination Port signal, the Destination Address buffer signal, the Source Address Control signal, the Source Address buffer signal, and the Group check signal;

a remoter, coupled to said address generator and said decoder, for generating a Remote Control signal and a Remote-Access Control signal in response to the Destination Port signal and either the Local-pkt signal, the Broadcast-pkt signal, or the Broadcast-pkt signal; and a DMA controller, coupled to the remoter, for generating and transfers a DMA control signal to said package buffer in response to the Remote-Access Control signal from said remoter;

said package buffer outputting and transferring the packet of the received node-information signal to the destination node in response to the DMA control signal.

13. The network switcher of claim 12, wherein said address generator includes:

a hasher, coupled to said multiplexer means, for processing the output of said multiplexer means to thereby generate a reset signal; and an address decoder coupled to said hasher, said address decoder having a built-in Address Table, said address decoder comparing the output of said multiplexer means with the Address Table;

wherein when the output of said multiplexer means is the Destination Address signal, said address decoder determines whether the reset signal and the Destination Address signal belong to the same group; if yes, said address decoder generating the Destination Address Control signal, the Destination Port signal, the Destination Address Group signal, and the Destination Address buffer signal; and when the output of said multiplexer means is the Source Address signal, said address decoder determines whether the reset signal and the Source Address signal belong to the same group; if yes, said address decoder generating the Source Address Control signal, the Source Address Group signal, and the Source Address buffer signal.

14. The network switcher of claim 13, wherein said address generator further includes:

a first buffer, coupled to said address decoder, for temporary storage of the Destination Address Control signal therein;

a second buffer, coupled to said address decoder, for temporary storage of the Destination Port signal therein;

a third buffer, coupled to said address decoder, for temporary storage of the Destination Address Group signal therein;

a fourth buffer, coupled to said address decoder, for temporary storage of the Destination Address buffer signal therein;

a fifth buffer, coupled to said address decoder, for temporary storage of the Source Address Control signal therein;

a sixth buffer, coupled to said address decoder, for temporary storage of the Source Address Group signal therein; and a seventh buffer, coupled to said address decoder, for temporary storage of the Source Address buffer signal therein.

* * * * *